United States Patent
Kim (10) Patent No.: US 10,744,987 B2
(45) Date of Patent: Aug. 18, 2020

(54) MASTER CYLINDER AND ELECTRONIC BRAKE SYSTEM INCLUDING THE SAME

(71) Applicant: MANDO CORPORATION, Gyeonggi-do (KR)

(72) Inventor: Hyun Dong Kim, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 35 days.

(21) Appl. No.: 16/058,794

(22) Filed: Aug. 8, 2018

(65) Prior Publication Data
US 2019/0047529 A1 Feb. 14, 2019

(30) Foreign Application Priority Data
Aug. 9, 2017 (KR) .................. 10-2017-0101189

(51) Int. Cl.
*B60T 11/16* (2006.01)
*B60T 13/68* (2006.01)
(Continued)

(52) U.S. Cl.
CPC ............. *B60T 11/165* (2013.01); *B60T 7/042* (2013.01); *B60T 8/38* (2013.01); *B60T 8/4081* (2013.01); *B60T 11/20* (2013.01); *B60T 13/166* (2013.01); *B60T 13/62* (2013.01); *B60T 13/66* (2013.01); *B60T 13/662* (2013.01); *B60T 13/686* (2013.01); *B60T 13/745* (2013.01)

(58) Field of Classification Search
CPC .......... B60T 7/042; B60T 8/38; B60T 8/4081; B60T 11/165; B60T 11/20; B60T 13/166; B60T 13/62; B60T 13/66; B60T 13/662; B60T 13/686; B60T 13/745
See application file for complete search history.

(56) References Cited

U.S. PATENT DOCUMENTS

| | | | |
|---|---|---|---|
| 7,922,263 B2 * | 4/2011 | Isono | ...................... B60T 7/042 303/114.1 |
| 8,342,615 B2 | 1/2013 | Drumm | |

(Continued)

FOREIGN PATENT DOCUMENTS

EP 2 520 473 11/2012

*Primary Examiner* — Thomas W Irvin
(74) *Attorney, Agent, or Firm* — Ladas & Parry, LLP (57) ABSTRACT

A master cylinder and an electronic brake system including the same are disclosed. The electronic brake system includes a main hydraulic-pressure supply device to generate hydraulic pressure by sensing displacement of a brake pedal and a sub hydraulic-pressure supply unit to supply hydraulic pressure to at least one wheel cylinder during an abnormal operation of the main hydraulic-pressure supply device. The master cylinder includes a first piston disposed in a bore of a cylinder body so as to be directly pressurized by the brake pedal, a first hydraulic chamber pressurized by the first piston to discharge hydraulic pressure, a second piston indirectly pressurized by the first piston, and a second hydraulic chamber pressurized by the second piston to discharge hydraulic pressure. The second hydraulic chamber includes a slippage prevention means connected to the sub hydraulic-pressure supply unit so as to prevent the second piston from moving toward the first piston by the hydraulic pressure received from the sub hydraulic-pressure supply unit.

11 Claims, 10 Drawing Sheets

(51) Int. Cl.
    *B60T 8/38*    (2006.01)
    *B60T 7/04*    (2006.01)
    *B60T 11/20*   (2006.01)
    *B60T 13/66*   (2006.01)
    *B60T 13/16*   (2006.01)
    *B60T 13/74*   (2006.01)
    *B60T 8/40*    (2006.01)
    *B60T 13/62*   (2006.01)

(56) References Cited

U.S. PATENT DOCUMENTS

| | | | |
|---|---|---|---|
| 9,651,634 B2* | 5/2017 | Kang | B60T 11/20 |
| 9,663,077 B2* | 5/2017 | Kamiya | B60T 8/326 |
| 10,005,441 B2* | 6/2018 | Matsunaga | B60T 1/10 |
| 10,029,665 B2* | 7/2018 | Okano | B60T 13/662 |
| 2014/0225425 A1 | 8/2014 | Drumm et al. | |
| 2016/0068146 A1* | 3/2016 | Matsunaga | B60T 1/10 60/545 |
| 2016/0339889 A1* | 11/2016 | Okano | B60T 7/042 |

* cited by examiner

MASTER CYLINDER AND ELECTRONIC BRAKE SYSTEM INCLUDING THE SAME

CROSS-REFERENCE TO RELATED APPLICATION

This application is based on and claims priority under 35 U.S.C. § 119 to Korean Patent Application No. 10-2017-0101189, filed on Aug. 9, 2017 in the Korean Intellectual Property Office, the disclosure of which is incorporated by reference in its entirety.

BACKGROUND

1. Field

Embodiments of the present disclosure relate to a master cylinder and an electronic brake system including the same.

2. Description of the Related Art

A brake system for braking of a vehicle is essentially mounted to a vehicle, and various systems have recently been proposed to obtain stronger and more stable braking force.

Examples of brake systems include anti-lock brake systems (ABSs) to prevent slippage of wheels during braking, brake traction control systems (BTCSs) to prevent slippage of driving wheels during sudden unintended acceleration from a stop or upon rapid acceleration of a vehicle, and electronic stability control systems (ESCs) to stably maintain a driving state of vehicles by controlling a brake hydraulic pressure through combination of an anti-lock brake (ABS) system with a brake traction control system.

Generally, an electronic brake system includes a hydraulic-pressure supply device. Once a driver pushes a brake pedal, the hydraulic-pressure supply device senses displacement of the pedal through a pedal displacement sensor, and receives an electric signal indicating the driver's braking intention from the pedal displacement sensor, such that pressure is supplied to wheel cylinders.

An electronic brake system provided with such an actuator has been disclosed in European Registered Patent No. EP 2 520 473. According to this European Patent document, the hydraulic-pressure supply device is configured such that a motor is activated according to a pedal effort of a brake pedal to generate braking pressure. At this point, the braking pressure is generated by converting rotational force of the motor into a rectilinear movement to pressurize a piston.

Meanwhile, when a hydraulic-pressure supply device of a conventional electronic brake system abnormally operates, a fallback mode in which hydraulic pressure of a master cylinder is directly transferred to wheel cylinders is activated, resulting in emergency braking of a vehicle. For example, a passive safety fail-safe system operating in the fallback mode is designed to transfer hydraulic pressure to wheel cylinders by pressurizing a piston of a master cylinder according to a pedal effort of a brake pedal.

In recent times, advanced active safety technologies, for example, an autonomous driving control system, a stop-and-go system, a collision mitigation system, etc. have been widely applied to the latest intelligent vehicles. However, when a system failure occurs in the vehicle, it takes a relatively long time for a driver who rides in the vehicle to recognize the presence or absence of the system failure until the passive safety fail-safe system is activated, resulting in a higher possibility of causing traffic accidents.

CITED REFERENCE

Patent Document

European Registered Patent No. EP 2 520 473 A1 (Honda Motor Co., Ltd.), (Nov. 7, 2012)

SUMMARY

Therefore, it is an aspect of the present disclosure to provide a master cylinder and an electronic brake system including the same, which include a sub hydraulic-pressure supply unit to supply hydraulic pressure to wheel cylinders during a failure state of a main system, and enable a user to manually perform braking of a vehicle when the entire system is shut down.

Additional aspects of the invention will be set forth in part in the description which follows and, in part, will be obvious from the description, or may be learned by practice of the invention.

In accordance with an aspect of the present disclosure, an electronic brake system includes a main hydraulic-pressure supply device to generate hydraulic pressure by sensing displacement of a brake pedal and a sub hydraulic-pressure supply unit to supply hydraulic pressure to at least one wheel cylinder during an abnormal operation of the main hydraulic-pressure supply device. The master cylinder includes a first piston disposed in a bore of a cylinder body so as to be directly pressurized by the brake pedal, a first hydraulic chamber pressurized by the first piston to discharge hydraulic pressure, a second piston indirectly pressurized by the first piston, and a second hydraulic chamber pressurized by the second piston to discharge hydraulic pressure. The second hydraulic chamber includes a slippage prevention means connected to the sub hydraulic-pressure supply unit so as to prevent the second piston from moving toward the first piston by the hydraulic pressure received from the sub hydraulic-pressure supply unit.

The slippage prevention means may include a support projection formed to protrude radially from an outer circumference of a front end of the second piston, and a step groove formed in the bore in a manner that a rear end of the support projection is caught thereby. The support projection is in contact with a step projection of the step groove such that movement of the second piston is restricted.

The support projection and the step projection may be spaced apart from each other by a predetermined distance.

The slippage prevention means may include a mounting groove formed along an outer circumference of a front end of the second piston, a circlip installed in the mounting groove while simultaneously protruding radially from an outer circumference of the second piston, and a step groove formed in the bore by which a rear end of the circlip is caught. The circlip is in contact with a step projection of the step groove such that movement of the second piston is restricted.

The cylinder body may be provided with a bore having a longitudinal hollow, and may further include a cap that is press-fitted into the cylinder body to close the hollow bore formed in a direction along which the second piston is arranged to form the second hydraulic chamber.

An outer circumference of the cap may be provided with a cap sealing member formed to maintain airtightness of the inside of the cylinder body.

The master cylinder may further include a sealing member formed to seal a gap between an inner surface of the cylinder body and an outer surface of each piston. The inner surface of the cylinder body in which the second piston is arranged may be provided with an auxiliary sealing member formed to bidirectionally maintain pressure in response to not only hydraulic pressure received from the sub hydraulic-pressure supply unit, but also pressurization of the first piston.

The master cylinder may further include a stopper provided in the cylinder body in a direction along which the first piston is arranged, configured to prevent the first piston from escaping from the bore by supporting a rear end of the first piston.

In accordance with another aspect of the present disclosure, an electronic brake system includes: a master cylinder which includes a first piston disposed in a bore of a cylinder body so as to be directly pressurized by a brake pedal, a first hydraulic chamber pressurized by the first piston to discharge hydraulic pressure, a second piston indirectly pressurized by the first piston, and a second hydraulic chamber pressurized by the second piston to discharge hydraulic pressure; a pedal simulator configured to provide reaction force in response to a pedal effort of the brake pedal, as well as to include a simulator chamber formed to receive oil by connecting to the master cylinder; a hydraulic control unit configured to control flow of hydraulic pressure flowing between the master cylinder and a wheel cylinder of each wheel; a main hydraulic-pressure supply device configured to operate by an electrical signal output in response to displacement of the brake pedal, and to supply hydraulic pressure to the hydraulic control unit; and a sub hydraulic-pressure supply unit configured to transfer hydraulic pressure to the hydraulic control unit through the master cylinder during an abnormal operation of the main hydraulic-pressure supply device. The second hydraulic chamber includes a slippage prevention means connected to the sub hydraulic-pressure supply unit so as to prevent the second piston from moving toward the first piston by the hydraulic pressure received from the sub hydraulic-pressure supply unit.

The slippage prevention means may include a support projection formed to protrude radially from an outer circumference of a front end of the second piston, and a step groove formed in the bore such that a rear end of the support projection is caught thereby. The support projection is in contact with a step projection of the step groove such that movement of the second piston is restricted.

The slippage prevention means may include a mounting groove formed along an outer circumference of a front end of the second piston, a circlip installed in the mounting groove while simultaneously protruding radially from an outer circumference of the second piston, and a step groove formed in the bore by which a rear end of the circlip is caught. The circlip is in contact with a step projection of the step groove such that movement of the second piston is restricted.

The cylinder body may be provided with a bore having a longitudinal hollow, and further includes a cap configured to close the hollow bore formed in a direction along which the second piston is arranged to form the second hydraulic chamber. The outer circumference of the cap may be provided with a cap sealing member formed to maintain air-tightness of the inside of the cylinder body.

The hydraulic control unit may include a first hydraulic circuit and a second hydraulic circuit, each of which supplies hydraulic pressure to at least one wheel cylinder. The first hydraulic chamber may communicate with a reservoir through a first reservoir passage, and may be connected to the first hydraulic circuit through a first backup passage. The second hydraulic chamber may communicate with a reservoir through a second reservoir passage, and may be connected to the second hydraulic circuit through a second backup passage. The sub hydraulic-pressure supply unit may be provided in the second reservoir passage.

The sub hydraulic-pressure supply unit may include a pump unit provided in the second reservoir passage, and a first control valve provided in a third reservoir passage through which the second reservoir passage is bypassed.

The sub hydraulic-pressure supply unit may further include a second control valve provided in a fourth reservoir passage through which the second and third reservoir passages are bypassed. The first control valve may be provided as a bidirectional solenoid valve configured to control bidirectional flow of oil. The second control valve may allow only flow of oil from the reservoir to the master cylinder.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments of the present disclosure, examples of which are illustrated in the accompanying drawings. The embodiments to be described below are provided to fully convey the spirit of the present disclosure to a person skilled in the art. The present disclosure is not limited to the embodiments disclosed herein and may be implemented in other forms. In the drawings, some portions not related to the description will be omitted and will not be shown in order to clearly describe the present disclosure, and also the size of the component may be exaggerated or reduced for convenience and clarity of description.

Figure 1:
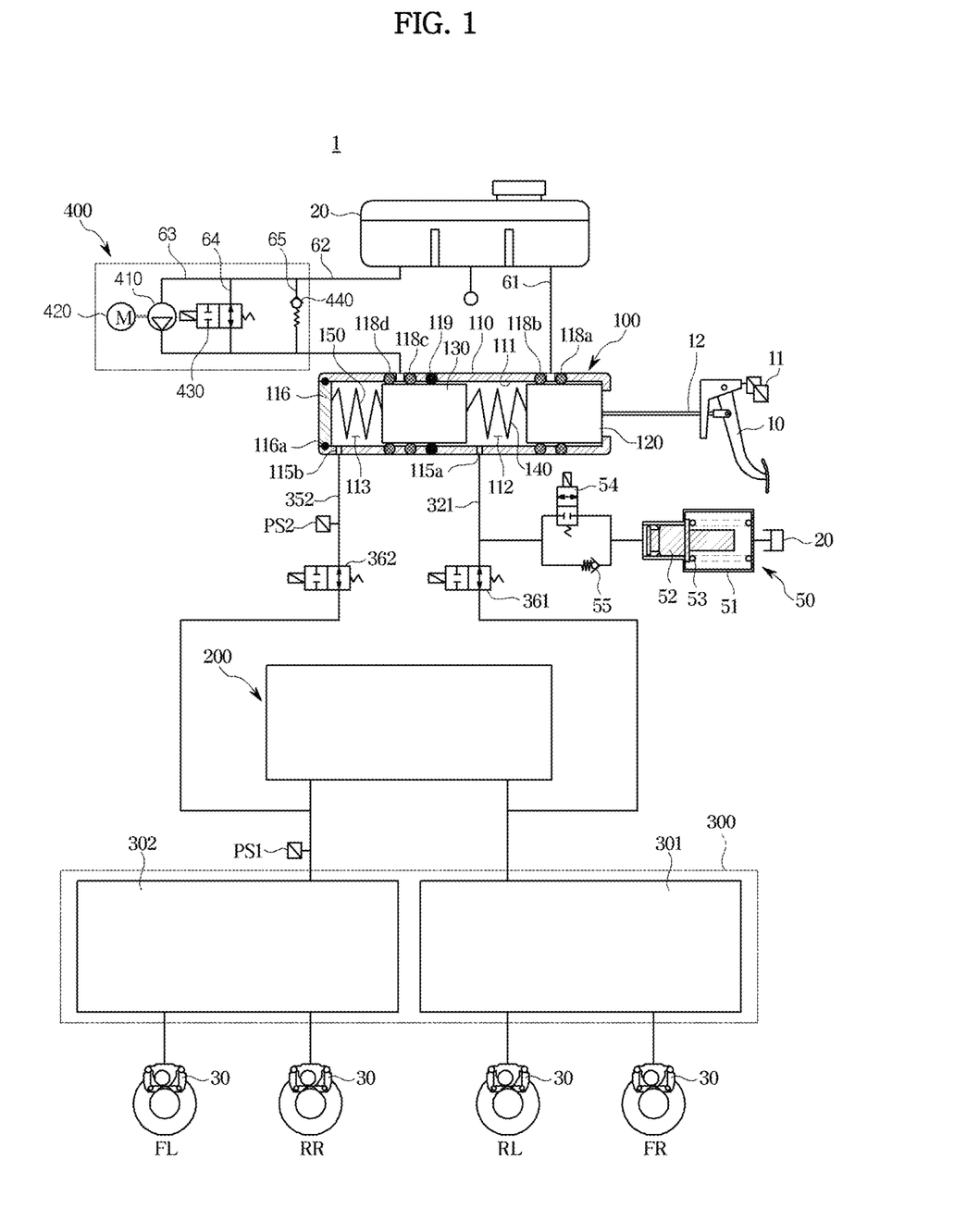
FIG. 1 is a hydraulic circuit diagram illustrating an electronic brake system according to an embodiment of the present disclosure.

FIG. 1 is a hydraulic circuit diagram illustrating a non-braking state of an electronic brake system 1 according to an embodiment of the present disclosure.

Referring to FIG. 1, an electronic brake system 1 generally includes a master cylinder 100 to generate hydraulic pressure, a reservoir 20 coupled to an upper portion of the master cylinder 100 to store oil, an input rod 12 to apply pressure to the master cylinder 100 according to a pedal effort of a brake pedal 10, wheel cylinders 30 to perform braking of the respective wheels RR, RL, FR, and FL when hydraulic pressure is transferred thereto, a pedal displacement sensor 11 to sense displacement of the brake pedal 10, and a simulation device 50 to provide reaction force corresponding to the pedal effort of the brake pedal 10.

The master cylinder 100 may be configured to have at least one chamber in a cylinder body 110, thereby generating hydraulic pressure. For example, the master cylinder 100 may include a first hydraulic chamber 112 and a second hydraulic chamber 113 in a bore 111 formed in the cylinder body 110.

Figure 2:
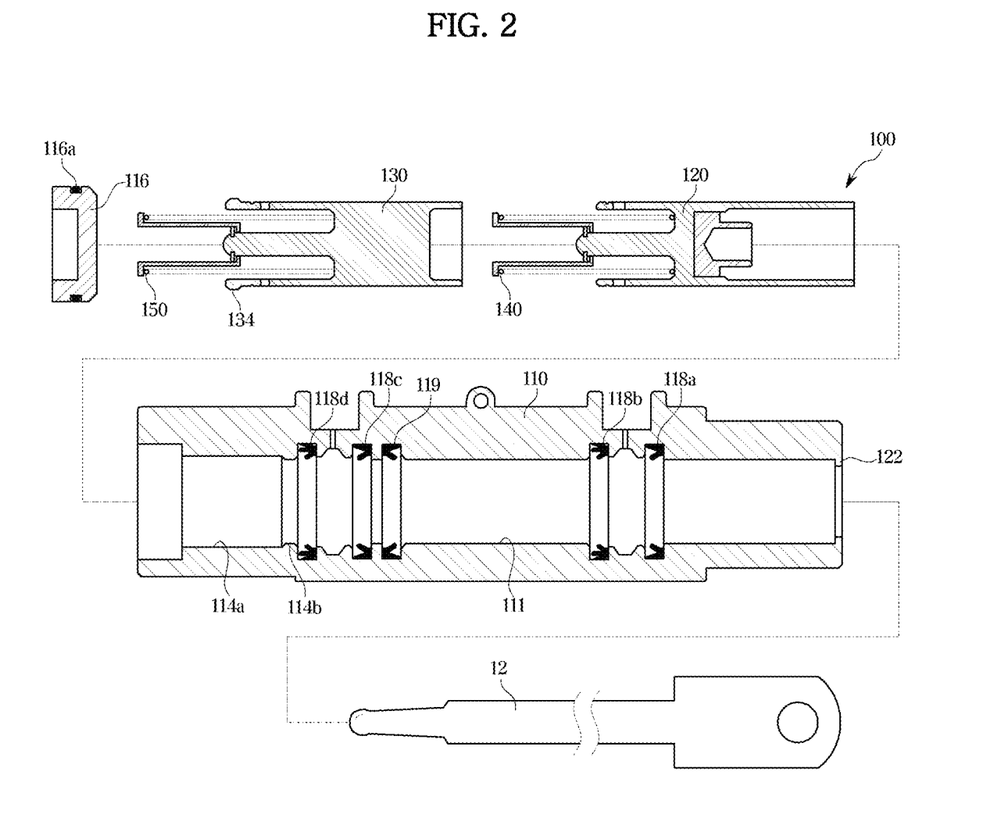
FIG. 2 is an exploded cross-sectional view illustrating a master cylinder of an electronic brake system according to an embodiment of the present disclosure.
Figure 3:
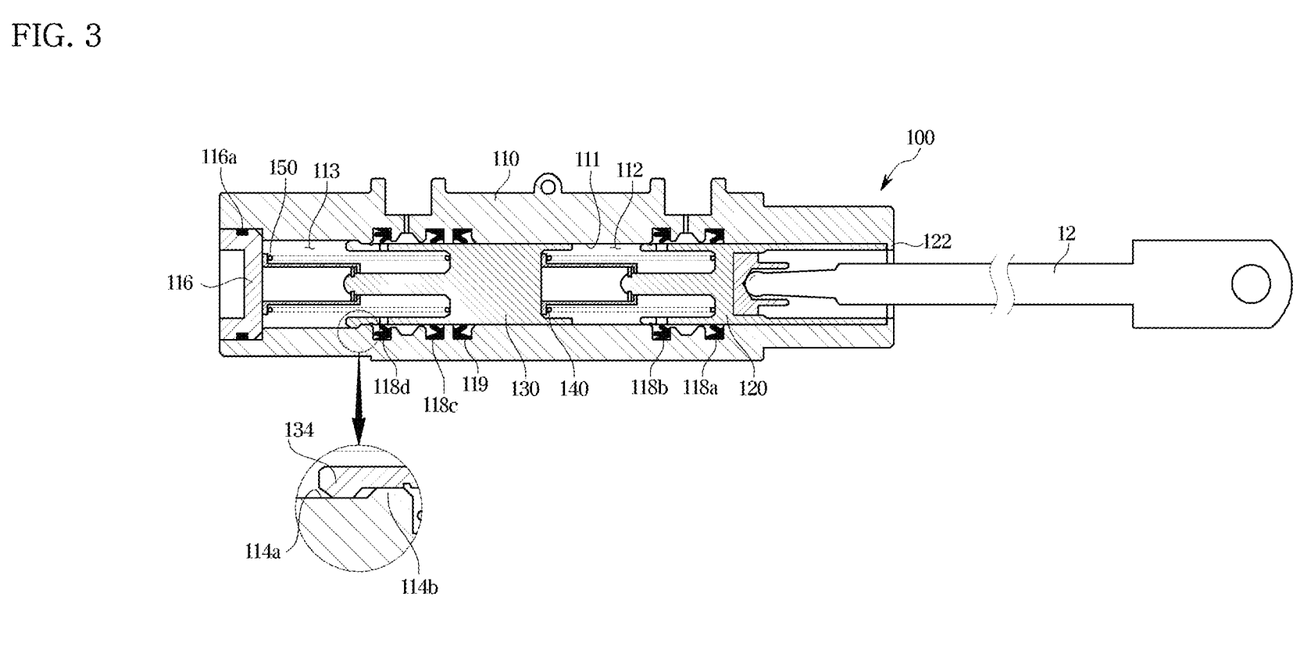
FIG. 3 is a cross-sectional view illustrating an assembled state of the master cylinder shown in FIG. 2.

Referring to FIGS. 2 and 3, the cylinder body 110 may include the bore 111 having a longitudinal hollow. Typically, the hydraulic chambers 112 and 113 may be formed by first and second pistons 120 and 130 and sealing members 118a, 118b, 118c, and 118d which are provided in the bore 111. In this case, since both sides of the bore 111 are opened in the longitudinal direction, a cap 116 is mounted in a manner that one end of the bore 111 is closed and the hydraulic chambers 112 and 113 are formed in the bore 111. As can be seen from FIGS. 2 and 3, the cap 116 may be press-fitted into the cylinder body 110 to close the hollow bore 111 formed in the direction along which the second piston 130 is arranged to form the second hydraulic chamber 113. In addition, an outer circumference of the cap 116 may be provided with a cap sealing member 116a configured to maintain airtightness of the inside of the cylinder body 110. Forming the hollow bore 111 in the cylinder body 110 and sealing one end of the cylinder body 110 through the cap 116 may allow the first and second pistons 120 and 130 to be inserted into the bore 111 through the bore 111 arranged in the direction along which the cap 116 is installed, because a slippage prevention means is used to prevent the second piston 130 from moving toward the first piston 120.

Here, the slippage prevention means is used to prevent the kickback phenomenon encountered when the second piston 120 moves toward the first piston 120 in response to movement of hydraulic pressure flowing from a sub hydraulic-pressure supply unit 400 (to be described later) to the second hydraulic chamber 113. A hydraulic-pressure supply structure based on the sub hydraulic-pressure supply unit 400 and associated operation states of the second piston 130 will hereinafter be described in detail.

The slippage prevention means may include a support projection 134 and a step groove 114a. The support projection 134 may protrude radially from the outer circumference of the front end of the second piston 130. The step groove 114a by which the rear end of the support projection 134 is caught may be formed in the bore 111. That is, the support projection 134 may contact a step projection 114b of the step groove 114a, and movement of the second piston 130 may be restricted by the support projection 134. In this case, the support projection 134 and the step projection 114b may be spaced apart from each other by a predetermined distance in a non-operation state of the master cylinder 100. As a result, when the first and second pistons 120 and 130 move back to original positions thereof, impact caused by contact between the support projection 134 and the step projection 114b is prevented.

In addition, a stopper 122, which prevents the first piston 120 from escaping from the bore 111 by supporting the rear end of the first piston 120, may be provided in the cylinder body 110 in the arrangement direction of the first piston 120.

The first hydraulic chamber 112 may include a first piston 120 connected to the input rod 12, and the second hydraulic chamber 113 may include a second piston 130. The first hydraulic chamber 112 may communicate with a first hydraulic port 115a through which oil is input and output. The second master chamber 113 may communicate with a second hydraulic port 115b through which oil is input and output. For example, the first hydraulic port 115a may be connected to a first backup passage 351, and the second hydraulic port 115b may be connected to a second backup passage 352.

The master cylinder 100 provided with two hydraulic chambers 112 and 113 may be designed to secure safety in the event of malfunction. For example, the first hydraulic chamber 112 from among the two hydraulic chambers 112 and 113 may be connected to the front right wheel FR and the rear left wheel RL of the vehicle through the first backup passage 351, and the other hydraulic chamber 113 may be connected to the front left wheel FL and the rear right wheel RR through the second backup passage 352. By configuring the two hydraulic chambers 112 and 113 to be independent of each other, braking of the vehicle remains possible even when one of the two hydraulic chambers malfunctions.

Alternatively, differently from the drawings, one of the two hydraulic chambers may be connected to two front wheels FR and FL, and the other hydraulic chamber may be connected to two rear wheels RR and RL.

One of the two hydraulic chambers may be connected to the front left wheel FL and the rear left wheel RL, and the other hydraulic chamber may be connected to the rear right wheel RR and the front right wheel FR. In other words, wheels connected to the hydraulic chambers of the master cylinder 100 may be located at various positions.

A first spring 140 may be disposed between the first piston 120 and the second piston 130 of the master cylinder 100, and a second spring 150 may be disposed between the second piston 130 and the cap 116. In other words, the first piston 120 may be contained in the first hydraulic chamber 112, and the second piston 120 may be contained in the second hydraulic chamber 113.

The first spring 140 and the second spring 150 may be compressed by the first piston 120 and the second piston 130 that move in response to change of displacement of the brake pedal 10, so that the first spring 140 and the second spring 150 may store elastic force generated by compression thereof. When force pushing the first piston 120 becomes weaker than the elastic force, the elastic force stored in the first and second springs 140 and 150 may push the first and second pistons 120 and 130 back to original positions thereof.

Meanwhile, the input rod 12 to pressurize the first piston 120 of the master cylinder 100 may closely contact the first piston 120 and a gap between the master cylinder 100 and the input rod 12 is thus not present. Therefore, the brake pedal 10 may directly pressurize the master cylinder 100 without a pedal free stroke region, when the brake pedal 10 is depressed.

The first hydraulic chamber 112 may be connected to the reservoir 20 through a first reservoir passage 61, and the second hydraulic chamber 113 may be connected to the reservoir 20 through a second reservoir passage 62.

The master cylinder 100 may include first and second sealing members 118a and 118b disposed between the inner surface of the cylinder body 110 and the outer surface of the first piston 120, and third and fourth sealing members disposed between the inner surface of the cylinder body 110 and the outer surface of the second piston 130. In more detail, the first and second sealing members 118a and 118b may be disposed before and after the first reservoir passage 61, and the third and fourth sealing members 118c and 118d may be disposed before and after the second reservoir passage 62. Each of the sealing members 118a, 118b, 118c, and 118d may be formed in a ring shape protruding from the inner surface of the master cylinder 100 or the outer circumference of the piston 120 or 130.

Meanwhile, the cylinder body 110 may further include an auxiliary sealing member 119. When hydraulic pressure is transferred from the sub hydraulic-pressure supply unit 400 to the second hydraulic chamber 113, the hydraulic pressure may be maintained by the auxiliary sealing member 119. For example, the auxiliary sealing member 119 may be provided at the rear of the third sealing member 118c disposed at the rear of the second reservoir passage 62. In this case, the third sealing member 118c may be constructed as a cup seal and the auxiliary sealing member 119 may be located symmetrical to the cup seal, because pressure is applied to both sides of the second hydraulic chamber 113 due to not only pressure caused by pressurization of the second piston 130, but also other pressure caused by transmission of hydraulic pressure received from the sub hydraulic-pressure supply unit 400. Accordingly, although the second hydraulic chamber 113 is pressurized by the second piston 130 and the sub hydraulic-pressure supply unit 400, pressure can be maintained by the auxiliary sealing member 119.

The simulation device 50 may be connected to a first backup passage 351 so as to provide reaction force corresponding to a pedal effort of the brake pedal 10. The simulation device 50 may provide reaction force to compensate for the pedal effort of the brake pedal 10 depressed by the driver, such that braking force can be precisely adjusted as intended by the driver.

Referring to FIG. 1, the simulation device 50 may include a simulation chamber 51 to store oil discharged from the first hydraulic port 115a of the master cylinder 100, a reaction force piston 52 provided in the simulation chamber 51, a pedal simulator provided with a reaction force spring 53 elastically supporting the reaction force piston 52, and a simulator valve 54 connected to a front end of the simulation chamber 51.

The reaction force piston 52 and the reaction force spring 53 may be installed to have a predetermined range of displacement within the simulation chamber 51 by oil flowing into the simulation chamber 51.

Meanwhile, the reaction force spring 53 is merely an example capable of supplying elastic force to the reaction force piston 52, and may be implemented as any of other examples capable of storing elastic force by shape deformation therein. For example, the reaction force spring 53 may be formed of a material such as rubber, or may include various members formed in a coil or plate shape to store elastic force therein.

The simulator valve 54 may be provided in a passage through which the first backup passage 251 is connected to the simulation chamber 51. The front end of the simulation chamber 51 may be connected to the master cylinder 100 through the simulator valve 54 and the first backup passage 351, and the rear end of the simulation chamber 51 may be connected to the reservoir 20.

The simulator valve 54 may be implemented as a normally closed (NC) solenoid valve that remains closed in a normal state. The simulator valve 54 is opened when the driver applies a pedal effort to the brake pedal 10 by depressing the brake pedal 10, such that oil stored in the simulation chamber 51 may flow into the reservoir 20.

In addition, the simulation chamber 51 may receive oil from the reservoir 20 when the reaction force piston 52 moves back to the original position thereof in an open state of the simulator valve 54, such that the simulation chamber 51 may always be fully filled with oil.

In addition, a simulator check valve 55 connected in parallel to the simulator valve 54 may be disposed between a pedal simulator and the reservoir 20. The simulator check valve 55 may allow oil from the simulation chamber 51 to flow into the first hydraulic chamber 112, and the oil of the first hydraulic chamber 112 may be prevented from flowing into the simulation chamber 51 through a passage in which the check valve 55 is installed. Therefore, when the driver takes a foot off the brake pedal 10 to release the pedal effort applied to the brake pedal 10, oil may leak from the simulation chamber 51 via the simulator check valve 55, such that pressure of the pedal simulator can rapidly return.

The pedal simulation device 50 may operate as follows. If a pedal effort is applied to the brake pedal 10 by the driver of the vehicle, oil received through the opened simulator valve 54 may pressurize the reaction force piston 52 of the pedal simulator, and oil stored in the simulation chamber 51 may flow into the reservoir 20 when the reaction force piston 52 compresses the reaction force spring 53, resulting in formation of proper pedal feel for the driver.

In contrast, if the driver takes a foot off the brake pedal 10 to release the pedal effort applied to the brake pedal 10, the released reaction force piston 52 may move back to an original position thereof by elastic force of the reaction force spring 53, and oil stored in the reservoir 20 may flow into the simulation chamber 51, such that the simulation chamber 51 may be fully filled with oil. Meanwhile, oil filled in the front end of the reaction force piston 52 within the simulation chamber 51 may return to the master cylinder 100 through one passage in which the simulator valve 54 is installed and the other passage in which the check valve 55 is installed.

As described above, since the simulation chamber 51 is always filled with oil in a braking situation and a releasing situation, frictional force of the reaction force piston 52 is minimized during operation of the simulation device 50, such that durability of the simulation device 50 can be improved and foreign materials from the outside can be prevented from flowing into the simulation device 50.

The electronic brake system 1 according to the embodiment of the present disclosure may include a main hydraulic-pressure supply device 200, a hydraulic control unit 300, a first cut valve 361, a second cut valve 362, and an electronic control unit (ECU) (not shown). The main hydraulic-pressure supply device 200 may mechanically operate by receiving an electrical signal indicating the driver's braking intention from the pedal displacement sensor 11. The hydraulic control unit 300 may include first and second hydraulic circuits 301 and 302, each of which includes two wheels (two of FR, FL, RR, and RL) and controls flow of hydraulic pressure supplied to the wheel cylinders 30 disposed in the two wheels (two of FR, FL, RR, and RL). The first cut valve 361 may be disposed in the first backup passage 351 configured to interconnect the first hydraulic port 115a and the first hydraulic circuit 301, and may control flow of hydraulic pressure. The second cut valve 362 may be disposed in the second backup passage 352 configured to interconnect the second hydraulic port 115b and the second hydraulic circuit 302, and may control flow of hydraulic pressure. The ECU may control the main hydraulic-pressure supply device 200 and valves in response to hydraulic pressure information and pedal displacement information.

The main hydraulic-pressure supply device 200 may supply oil pressure to wheel cylinders 30. The main hydraulic-pressure supply device 200 may be constructed in various ways. For example, oil stored in the chamber is pushed by the piston (not shown) configured to operate by driving force of a motor (not shown), such that hydraulic pressure can be transferred to the wheel cylinders 30. Alternatively, the main hydraulic-pressure supply device 200 may also be implemented as a pump driven by the motor or as a high-pressure accumulator.

More particularly, since displacement of the brake pedal 10 is changed by the driver who depresses the brake pedal 10, the pedal displacement sensor 11 may output an electrical signal, such that the motor may operate by this electrical signal. A power switching unit to convert rotational motion into rectilinear motion may be disposed between the motor and the piston. The power switching unit may include a worm, a worm gear, and/or a rack-and-pinion gear.

The hydraulic control unit 300 may include a first hydraulic circuit 301 and a second hydraulic circuit 302, each of which receives hydraulic pressure to control two wheels. For example, the first hydraulic circuit 301 may control the front right wheel FR and the rear left wheel RL, and the second hydraulic circuit 302 may control the front left wheel FL and the rear right wheel RR. The wheel cylinders 30 may be respectively mounted in the four wheels FR, FL, RR, and RL, and hydraulic pressure is supplied to the wheel cylinders 30, resulting in braking of the vehicle.

The hydraulic control unit 300 may include inlet valves (not shown) provided at front ends of the respective wheel cylinders 30 to control flow of hydraulic pressure, and outlet valves (not shown) connected to the reservoir 20 while being respectively branched from any point between the inlet valves and the wheel cylinders 30.

Meanwhile, reference numeral 'PS1' not illustrated is a hydraulic-passage pressure sensor to sense hydraulic pressure of the hydraulic circuit 301 or 302, and reference numeral 'PS2' not illustrated is a backup-passage pressure sensor to measure oil pressure of the master cylinder 100.

Figure 4:
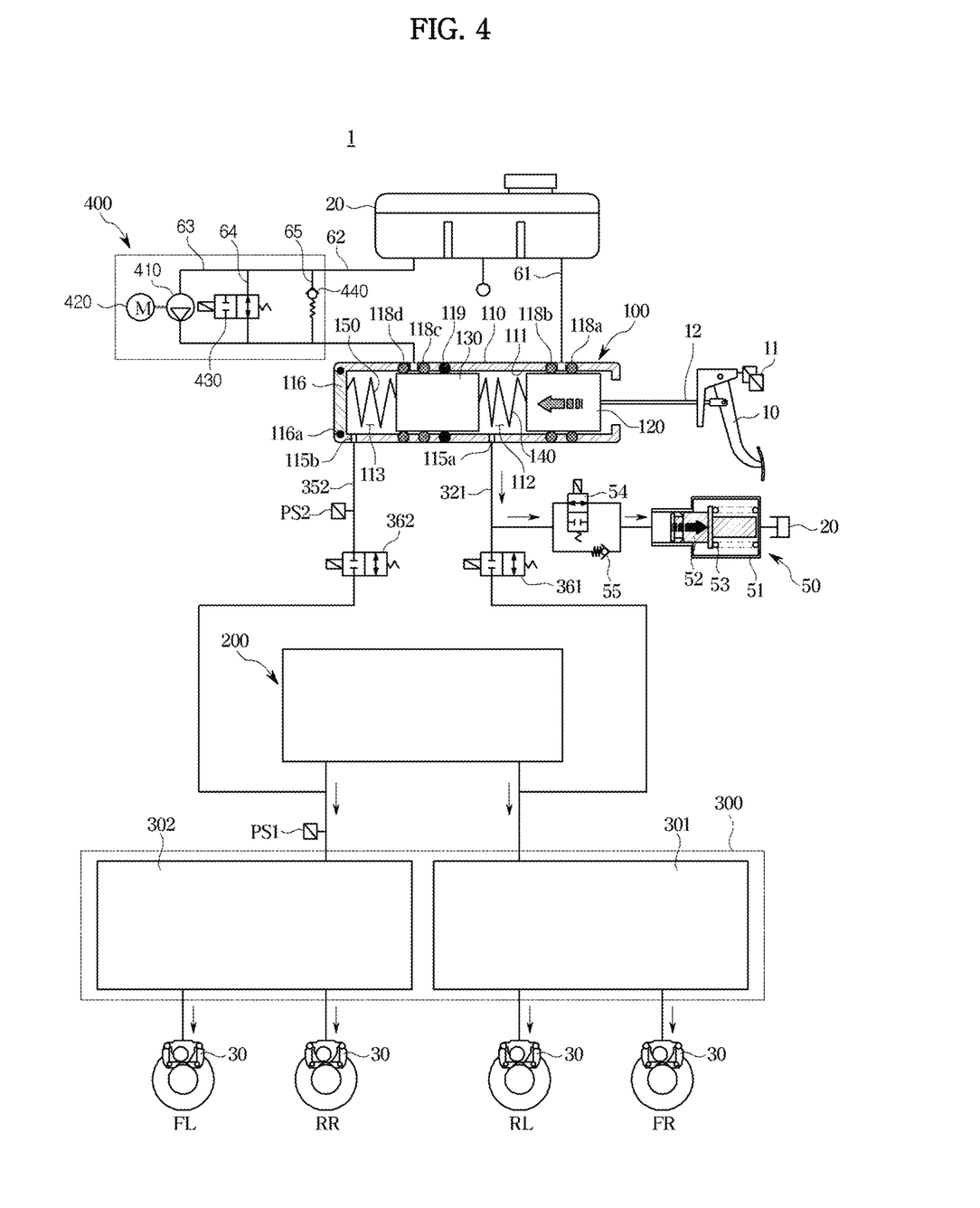
FIG. 4 is a hydraulic circuit diagram illustrating operation states of the electronic brake system configured to normally operate according to an embodiment of the present disclosure.
Figure 5:
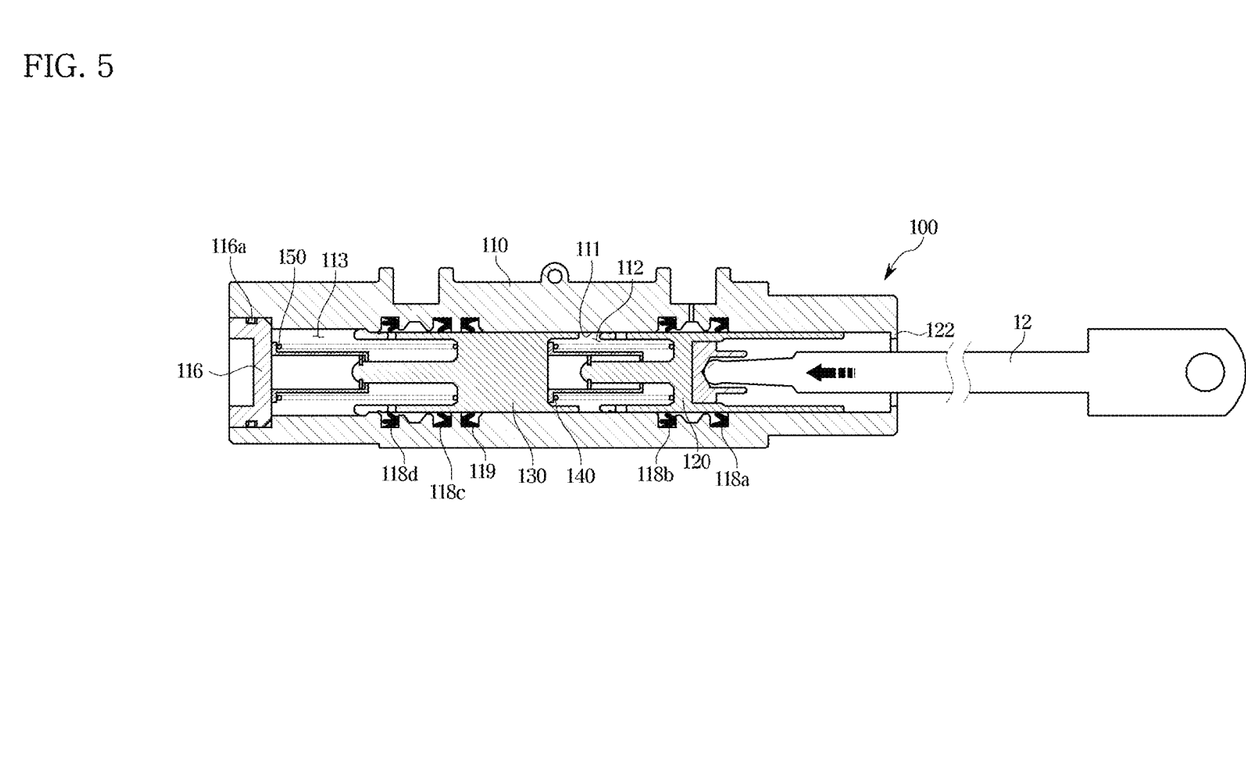
FIG. 5 is an enlarged view illustrating operation states of the master cylinder based on the operations shown in FIG. 4.

When braking of the vehicle is conducted by the above-mentioned electronic brake system 1, if a normal braking state is decided, the electronic brake system 1 may sense pedal displacement based on a pedal effort applied to the brake pedal 10, and may allow the main hydraulic-pressure supply device 200 to operate by an electrical signal corresponding to the sensed pedal displacement. That is, as shown in FIGS. 4 and 5, hydraulic pressure generated from the main hydraulic-pressure supply device 200 by a pedal effort of the brake pedal 10 may be transferred to the respective wheel cylinders 30 through the hydraulic control unit 300. In this case, the cut valves 361 and 362 provided in the backup passages 351 and 352 configured to interconnect the hydraulic ports 115a and 115b and the wheel cylinders 30 of the master cylinder 100 may be transitioned to a closed state, such that the closed cut valves 361 and 362 may prevent hydraulic pressure from flowing into the wheel cylinders 30.

When the first piston 120 is pressurized in response to a pedal effort applied to the brake pedal 10, hydraulic pressure discharged from the first hydraulic chamber 112 may be applied to the pedal simulator, resulting in formation of proper pedal feel for the driver. In this case, pressure of the first hydraulic chamber 112 is bypassed to the pedal simulator, such that the second piston 130 does not operate any more.

Referring back to FIG. 1, the electronic brake system 1 may include the sub hydraulic-pressure supply unit 400. The sub hydraulic-pressure supply unit 400 may be provided to transfer hydraulic pressure to the wheel cylinders in an emergency situation. In this case, the emergency situation may refer to an exemplary situation in which the main hydraulic-pressure supply device 200 abnormally operates.

If a pedal effort is applied to the brake pedal 10 by the driver of the vehicle, the cut valves 361 and 362 are closed in a normal state. As a result, hydraulic pressure of the master cylinder 100 is not transferred to the wheel cylinders 30, and the main hydraulic-pressure supply device 200 operating by an output signal of the ECU transfers hydraulic pressure to the wheel cylinders 30, resulting in braking of wheels. In this case, the ECU may control the main hydraulic-pressure supply device 200 such that braking force desired by the driver can be generated in response to a pressure increase ratio desired by the driver.

However, if the main hydraulic-pressure supply device 200 abnormally operates, the sub hydraulic-pressure supply unit 500 may operate to perform stable braking. For example, the sub hydraulic-pressure supply unit 400 may be more efficiently used during operation of an autonomous driving control system, a stop-and-go system, or a collision mitigation system. In other words, if the driver does not recognize malfunction of the main hydraulic-pressure supply device 200, the sub hydraulic-pressure supply unit 400 may start operation.

Referring to FIG. 1, the sub hydraulic-pressure supply unit 400 may be disposed between the reservoir 20 and the master cylinder 100. For example, the sub hydraulic-pressure supply unit 400 may be provided at the second reservoir passage 62 through which the reservoir 20 is connected to the second hydraulic chamber 113.

The sub hydraulic-pressure supply unit 400 may include pump units 410 and 420 provided at a third reservoir passage 63 connected to the second reservoir passage 62. Each of the pump units 410 and 420 may include a motor 320 operated by a command of a control unit (not shown), and a pump 310 operated by driving force of the motor 320 to boost hydraulic pressure. In this case, the control unit may be integrated with the ECU configured to transmit a command to the main hydraulic-pressure supply device 200, or may be constructed to be separated from the ECU as necessary. If the control unit is constructed to be separated from the ECU, the control unit can transmit a necessary command to the sub hydraulic-pressure supply unit 400 even when the main hydraulic-pressure supply device 200 abnormally operates due to malfunction of the ECU.

The sub hydraulic-pressure supply unit 400 may include a first control valve 430 and a second control valve 440. The first control valve 430 may be provided at a fourth reservoir passage 64 arranged parallel to the third reservoir passage 63. The second control valve 440 may be provided at a fifth reservoir passage 65 arranged parallel to the third and fourth reservoir passages 63 and 64.

The fifth control valve 430 may be implemented as a solenoid valve to control bidirectional flow of oil between the reservoir 20 and the master cylinder 100. Thus, oil of the reservoir 20 may flow into the master cylinder 100 through the first control valve 430, or the oil may move back from the master cylinder 100 to the reservoir 20 as necessary. In detail, the first control valve 430 may be implemented as a normally open (NO) solenoid valve that remains open in a normal state and is closed upon receiving a closing signal from the ECU. In this case, if hydraulic pressure is transferred to the second hydraulic chamber 113 through the sub hydraulic-pressure supply unit 400, the first control valve 430 may transition to a closed state. That is, oil of the reservoir 20 may flow into the third reservoir passage 63, and may then be transferred to the second hydraulic chamber 113 of the master cylinder 100 through operation of the pump 410.

The second control valve 440 may be implemented as a check valve that allows oil to flow from the reservoir 20 to the master cylinder 100 and prevents oil from flowing from the master cylinder 100 to the reservoir 20. The second control valve 440 may allow oil to flow from the reservoir 20 to the master cylinder 100 in a manner that emergency braking can be conducted even in an emergency situation in which the first control valve 430 is not open.

Figure 6:
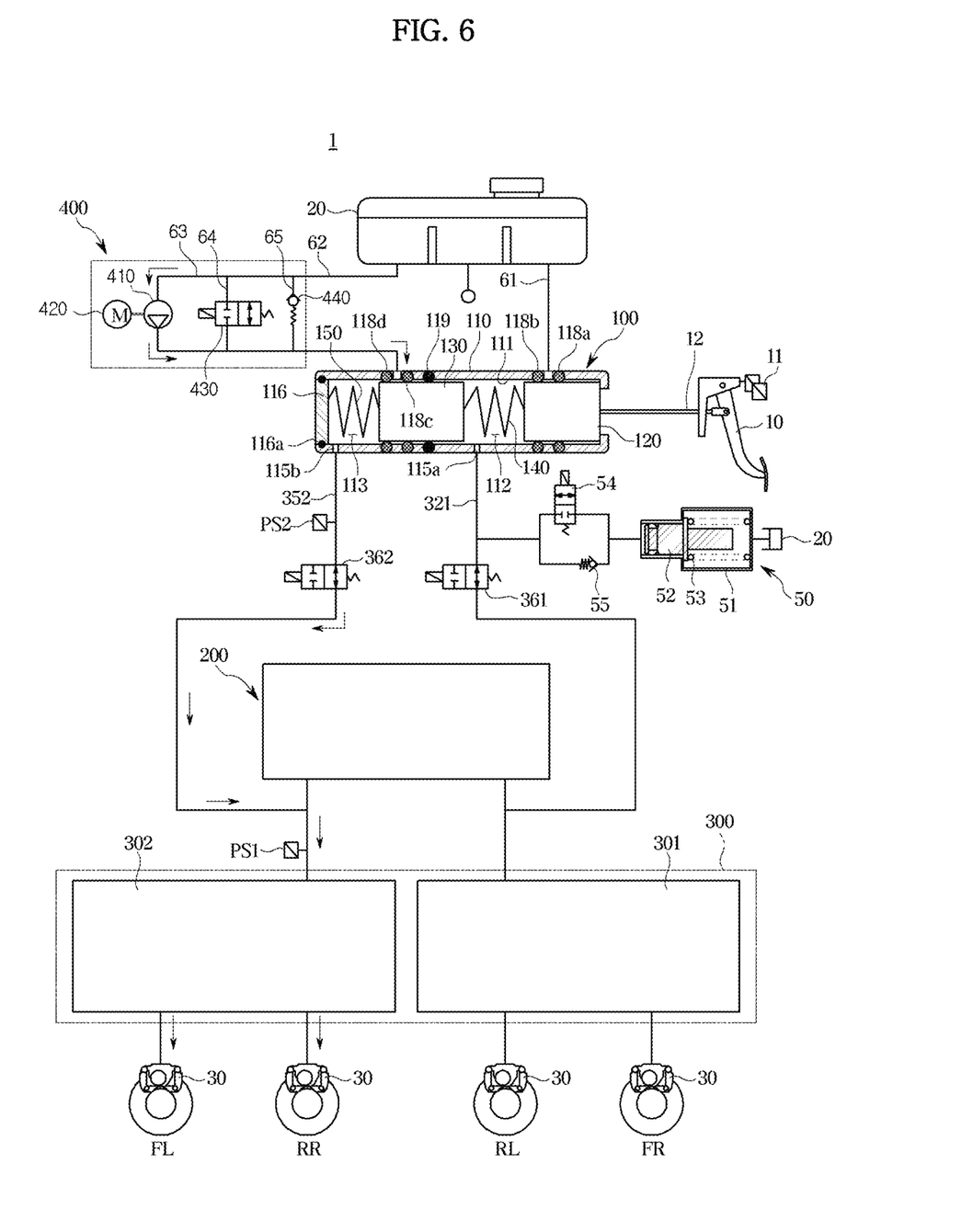
FIG. 6 is a hydraulic circuit diagram illustrating operation states of a sub hydraulic-pressure supply unit during an abnormal operation of a main hydraulic-pressure supply device of the electronic brake system according to an embodiment of the present disclosure.
Figure 7:
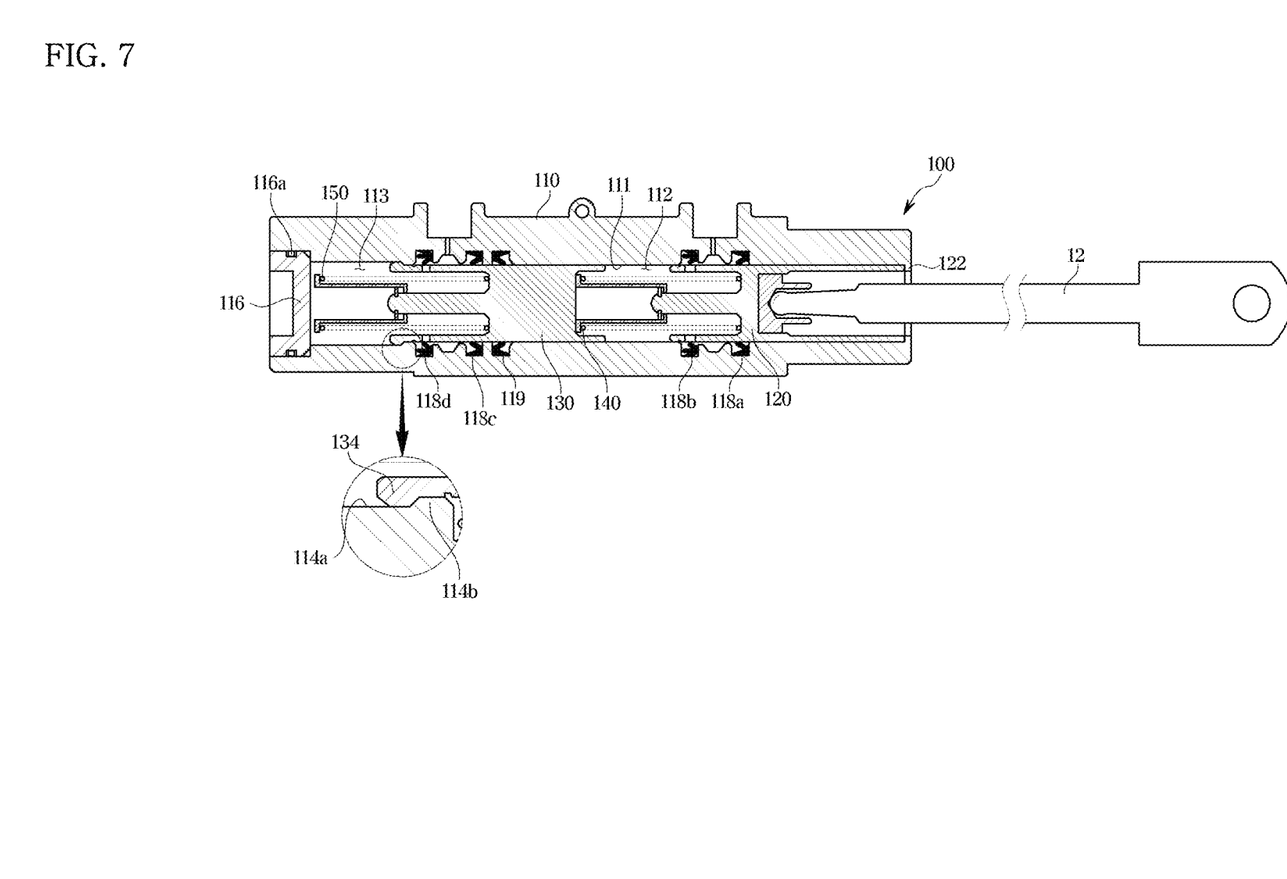
FIG. 7 is an enlarged view illustrating operation states of the master cylinder based on the operations shown in FIG. 6.

The sub hydraulic-pressure supply unit 400 can transfer hydraulic pressure to the wheel cylinders 30 through the second hydraulic chamber 113 even in an abnormal operation of the main hydraulic-pressure supply device 200. In more detail, as shown in FIGS. 6 and 7, if the main hydraulic-pressure supply device 200 abnormally operates when the vehicle is in any one of an autonomous driving control system mode, a stop-and-go system mode, and a collision mitigation system mode, the ECU or the control unit may detect the abnormal operation of the main hydraulic-pressure supply device 200, thereby generating hydraulic pressure through the sub hydraulic-pressure supply unit 400. The hydraulic pressure generated through the sub hydraulic-pressure supply unit 400 may be transferred to the second hydraulic chamber 113. In this case, the first control valve 440 may transition to a closed state.

When transferring hydraulic pressure to the second hydraulic chamber 113, the support projection 134 is in contact with the step projection 114b, such that the second piston 130 disposed in the second hydraulic chamber 113 does not move toward the first piston 120 and movement of the second piston 130 may be restricted. Therefore, hydraulic pressure transferred to the second hydraulic chamber 113 may be discharged through the second backup passage 351, such that the resultant hydraulic pressure may be transferred to the wheel cylinders 30 of the second hydraulic circuit 202.

Although the embodiment of the present disclosure has exemplarily disclosed that hydraulic pressure is transferred to wheel cylinders 30 of the second hydraulic circuit 202 through the sub hydraulic-pressure supply unit 400 due to malfunction of the main hydraulic-pressure supply device 200, the scope or spirit of the present disclosure is not limited thereto, and the sub hydraulic-pressure supply unit 400 may be coupled to each of the first hydraulic chamber 112 and the second hydraulic chamber 113, such that hydraulic pressure can also be transferred to each of the wheel cylinders 30.

In addition, if the driver recognizes malfunction of the main hydraulic-pressure supply device 200 and applies a pedal effort to the brake pedal by depressing the brake pedal, hydraulic pressure caused by the sub hydraulic-pressure supply unit 400 may be added to the other hydraulic pressure of the master cylinder 100 affected by the pedal effort applied to the brake pedal, such that the sum of the two hydraulic pressures may be transferred to the wheel cylinders 30 as necessary.

Figure 8:
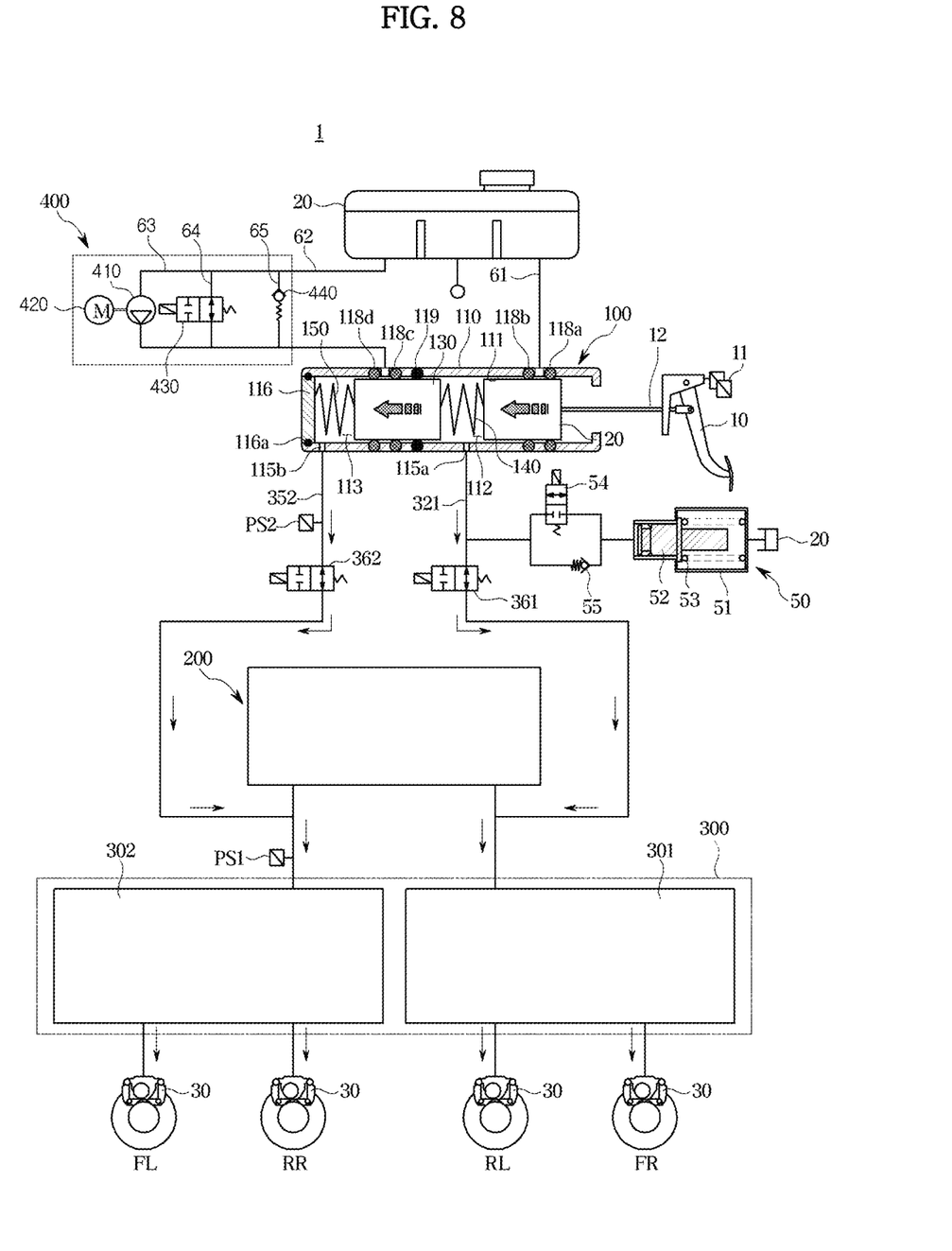
FIG. 8 is a hydraulic circuit diagram illustrating manually-operated states of the electronic brake system when the electronic brake system is shut down according to an embodiment of the present disclosure.
Figure 9:
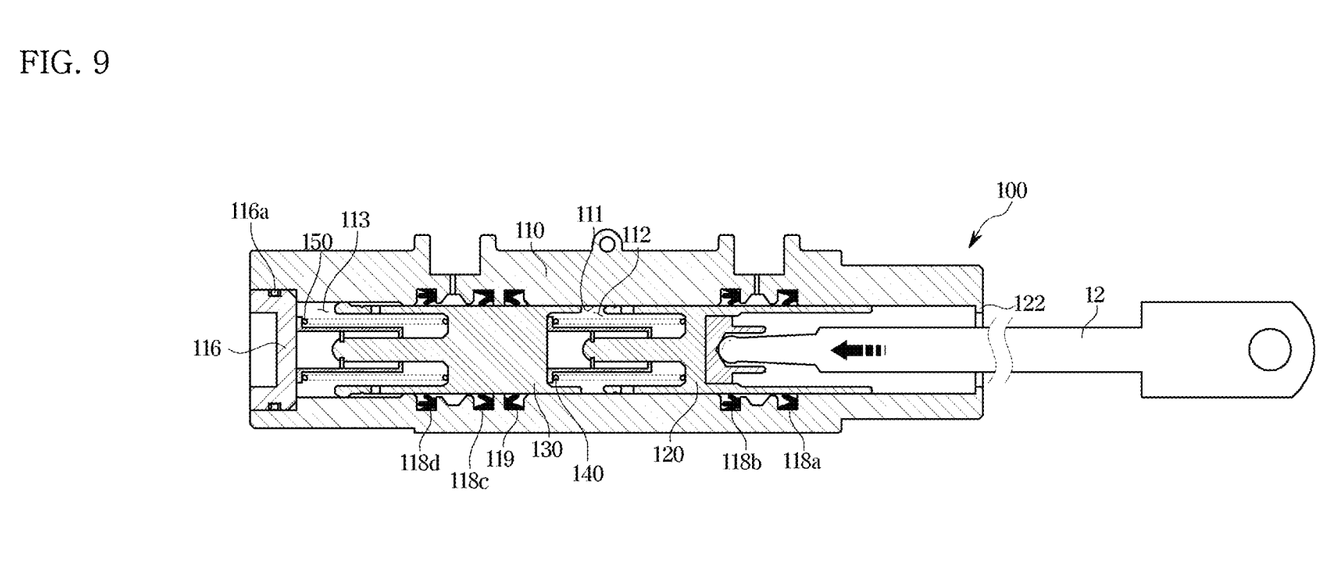
FIG. 9 is an enlarged view illustrating operation states of the master cylinder based on the operations shown in FIG. 8.

Meanwhile, when the electronic brake system 1 according to one embodiment of the present disclosure is shut down, a system mode is shifted to a passive safety fail-safe mode. That is, the driver directly depresses the brake pedal 10 such that hydraulic pressure can be directly transferred to the wheel cylinders 30. In more detail, as shown in FIGS. 8 and 9, when all systems, for example, the main hydraulic-pressure supply device 200, the sub hydraulic-pressure supply unit 400, the hydraulic control unit 300, etc., abnormally operate, the first and second pistons 120 and 130 may operate in response to a pedal effort of the brake pedal 10, such that hydraulic pressure may be discharged from the first and second hydraulic chambers 112 and 113. This hydraulic pressure may be transferred to the wheel cylinders 30 through the first and second backup passages 351 and 352. In this case, the cut valves 361 and 362 may remain open.

Figure 10:
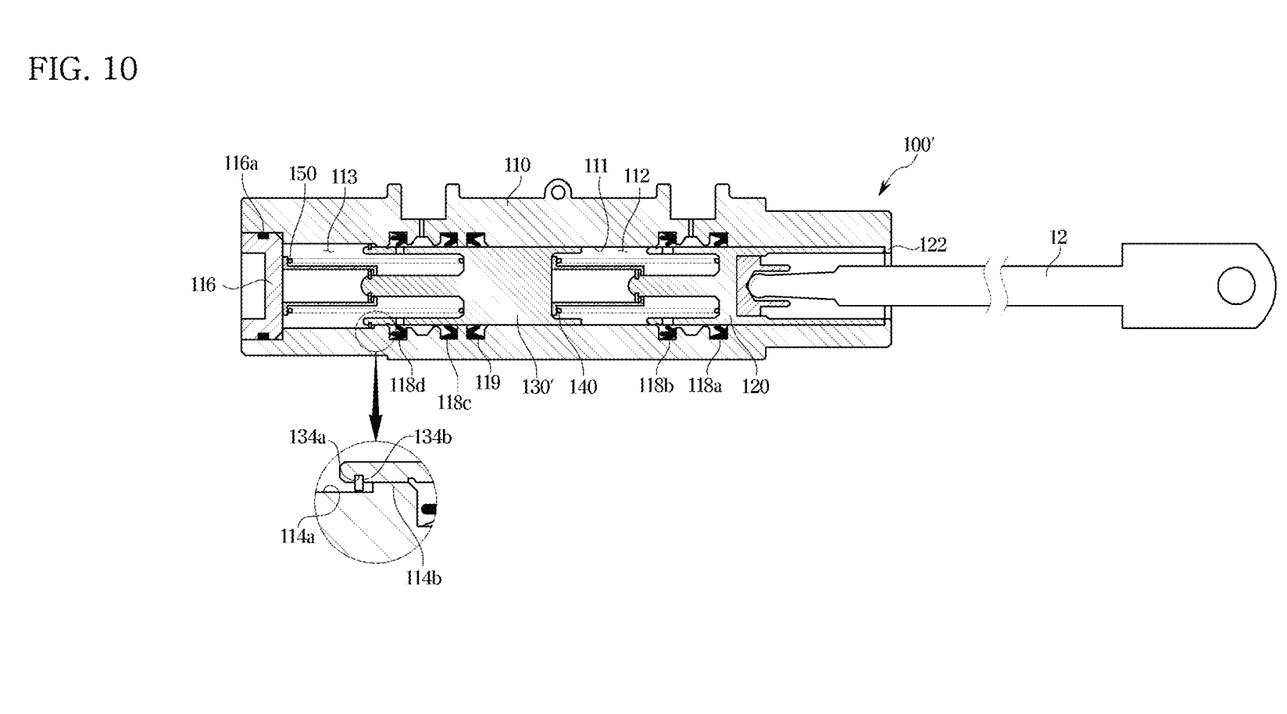
FIG. 10 is a cross-sectional view illustrating a master cylinder of an electronic brake system according to another embodiment of the present disclosure.

In the meantime, although the above-mentioned embodiment has exemplarily disclosed that each of the master cylinder 100 and the electronic brake system 1 including the same has a slippage prevention means composed of a contact structure between the support projection 134 formed in the second piston 130 and the step projection 114b formed in the bore 111 for convenience of description and better understanding of the present disclosure, the scope or spirit of the present disclosure is not limited thereto. Provided that the second piston 130 is prevented from moving toward the first piston 120, the second piston 130 may be deformed in various shapes and then used. For example, FIG. 10 is a view illustrating a master cylinder 100' provided with a slippage prevention means according to another embodiment of the present disclosure. In FIG. 10, the same reference numbers as in FIGS. 1 to 9 will be used to refer to the same or like parts, and thus a detailed description thereof will be omitted herein for convenience of description.

Referring to FIG. 10, the slippage prevention means according to the embodiment of the present disclosure may include a mounting groove 134a formed along an outer circumference of a front end of a second piston 130', a circlip 134b installed in the mounting groove 134a while simultaneously protruding radially from the outer circumference of the second piston 130', and a step groove 114a formed in the bore 111 in a manner that a rear end of the circlip 134b is caught thereby. In other words, the circlip 134b is in contact with the step projection 114b of the step groove 114a, and movement of the second piston 130' is restricted. In this case, the circlip 134b and the step projection 114b may be spaced apart from each other by a predetermined distance in a non-operation state of a master cylinder 100'. As a result, when the first and second pistons 120 and 130b move back to original positions thereof, impact caused by contact between the circlip 134b and the support projection 114b can be prevented.

As is apparent from the above description, the master cylinder and the electronic brake system including the same according to the embodiments of the present disclosure may supply braking pressure to wheel cylinders of a vehicle using a sub hydraulic-pressure supply unit during an abnormal operation of a system configured to provide braking pressure using a main hydraulic-pressure supply device, resulting in stable braking of the vehicle. That is, even in an emergency situation in which braking pressure must be applied to the vehicle without receiving a pedal effort of a brake pedal to be depressed by the driver, the embodiments of the present disclosure can supply braking pressure to wheel cylinders using the sub hydraulic-pressure supply unit. As a result, although it takes a predetermined time for a driver of the vehicle to recognize occurrence of system failure, stable braking of the vehicle can be carried out.

The embodiment of the present disclosure can prevent slippage of a piston when hydraulic pressure generated by the sub hydraulic-pressure supply unit is transferred to a brake pedal through the master cylinder, resulting in prevention of a kickback phenomenon.

The embodiments of the present disclosure may enable the driver of the vehicle to manually generate braking pressure even when the entire system is shut down, and may supply the generated braking pressure to wheel cylinders, resulting in stable braking of the vehicle.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A master cylinder for an electronic brake system which includes a main hydraulic-pressure supply device to generate hydraulic pressure by sensing displacement of a brake pedal and a sub hydraulic-pressure supply unit to supply hydraulic pressure to at least one wheel cylinder during an abnormal operation of the main hydraulic-pressure supply device, the master cylinder comprising:
   a first piston disposed in a bore of a cylinder body, configured to be directly pressurized by the brake pedal;
   a first hydraulic chamber pressurized by the first piston, configured to discharge hydraulic pressure;
   a second piston indirectly pressurized by the first piston; and
   a second hydraulic chamber pressurized by the second piston, configured to discharge hydraulic pressure,
   wherein the second hydraulic chamber includes a slippage prevention means connected to the sub hydraulic-pressure supply unit so as to prevent the second piston from moving toward the first piston by the hydraulic pressure received from the sub hydraulic-pressure supply unit,
   wherein the slippage prevention means includes: a mounting groove formed along an outer circumference of a front end of the second piston; a circlip installed in the mounting groove while simultaneously protruding radially from an outer circumference of the second piston; and a step groove formed in the bore by which a rear end of the circlip is caught, and
   wherein the circlip is in contact with a step projection of the step groove such that movement of the second piston is restricted.

2. The master cylinder according to claim 1, wherein the circlip and the step projection are spaced apart from each other by a predetermined distance.

3. The master cylinder according to claim 1, wherein the cylinder body is provided with a bore having a longitudinal hollow, and further includes a cap that is press-fitted into the cylinder body to close the hollow bore formed in a direction along which the second piston is arranged to form the second hydraulic chamber.

4. The master cylinder according to claim 3, wherein:
   an outer circumference of the cap is provided with a cap sealing member formed to maintain airtightness of the inside of the cylinder body.

5. The master cylinder according to claim 1, further comprising:
   a sealing member formed to seal a gap between an inner surface of the cylinder body and an outer surface of each piston; and
   wherein the inner surface of the cylinder body in which the second piston is arranged is provided with an auxiliary sealing member formed to bidirectionally maintain pressure in response to not only hydraulic pressure received from the sub hydraulic-pressure supply unit, but also pressurization of the first piston.

6. The master cylinder according to claim 1, further comprising:
   a stopper provided in the cylinder body in a direction along which the first piston is arranged, configured to prevent the first piston from escaping from the bore by supporting a rear end of the first piston.

7. An electronic brake system comprising:
   a master cylinder which includes a first piston disposed in a bore of a cylinder body so as to be directly pressurized by a brake pedal, a first hydraulic chamber pressurized by the first piston to discharge hydraulic pressure, a second piston indirectly pressurized by the first piston, and a second hydraulic chamber pressurized by the second piston to discharge hydraulic pressure;
   a pedal simulator configured to provide reaction force in response to a pedal effort of the brake pedal, as well as to include a simulator chamber formed to store oil by connecting to the master cylinder;
   a hydraulic control unit configured to control flow of hydraulic pressure flowing between the master cylinder and a wheel cylinder of each wheel;
   a main hydraulic-pressure supply device configured to operate by an electrical signal output in response to displacement of the brake pedal, and to supply hydraulic pressure to the hydraulic control unit; and
   a sub hydraulic-pressure supply unit configured to transfer hydraulic pressure to the hydraulic control unit through the master cylinder during an abnormal operation of the main hydraulic-pressure supply device,
   wherein the second hydraulic chamber includes a slippage prevention means connected to the sub hydraulic-pressure supply unit so as to prevent the second piston from moving toward the first piston by the hydraulic pressure received from the sub hydraulic-pressure supply unit,
   wherein the slippage prevention means includes: a mounting groove formed along an outer circumference of a front end of the second piston; a circlip installed in the mounting groove while simultaneously protruding radially from an outer circumference of the second piston; and a step groove formed in the bore by which a rear end of the circlip is caught, and
   wherein the circlip is in contact with a step projection of the step groove such that movement of the second piston is restricted.

8. The electronic brake system according to claim 7, wherein the cylinder body is provided with a bore having a longitudinal hollow, and further includes a cap configured to close the hollow bore formed in a direction along which the second piston is arranged to form the second hydraulic chamber, and
   an outer circumference of the cap is provided with a cap sealing member formed to maintain airtightness of the inside of the cylinder body.

9. The electronic brake system according to claim 7, wherein:

the hydraulic control unit includes a first hydraulic circuit and a second hydraulic circuit, each of which supplies hydraulic pressure to at least one wheel cylinder;

the first hydraulic chamber communicates with a reservoir through a first reservoir passage, and is connected to the first hydraulic circuit through a first backup passage;

the second hydraulic chamber communicates with a reservoir through a second reservoir passage, and is connected to the second hydraulic circuit through a second backup passage; and the sub hydraulic-pressure supply unit is provided in the second reservoir passage.

10. The electronic brake system according to claim 9, wherein the sub hydraulic-pressure supply unit includes:

a pump unit provided in the second reservoir passage; and a first control valve provided in a third reservoir passage through which the second reservoir passage is bypassed.

11. The electronic brake system according to claim 10, wherein:

the sub hydraulic-pressure supply unit further includes a second control valve provided in a fourth reservoir passage through which the second and third reservoir passages are bypassed;

the first control valve is provided as a bidirectional solenoid valve configured to control bidirectional flow of oil; and the second control valve allows only flow of oil from the reservoir to the master cylinder.

* * * * *